United States Patent
Williamson et al.

(10) Patent No.: US 8,771,576 B2
(45) Date of Patent: Jul. 8, 2014

(54) PROCESSES FOR PROVIDING IMAGES ON RESIN STRUCTURES

(71) Applicant: Giovanni Holdings, LLC, Lindon, UT (US)

(72) Inventors: Kirk D. Williamson, Orem, UT (US); Doug E. Thompson, Pleasant Grove, UT (US)

(73) Assignee: Giovanni Holdings, LLC, Lindon, UT (US)

(*) Notice: Subject to any disclaimer, the term of this patent is extended or adjusted under 35 U.S.C. 154(b) by 0 days.

(21) Appl. No.: 13/854,069

(22) Filed: Mar. 30, 2013

(65) Prior Publication Data

US 2013/0228270 A1    Sep. 5, 2013

Related U.S. Application Data

(63) Continuation of application No. 11/726,727, filed on Mar. 21, 2007, now Pat. No. 8,480,939.

(51) Int. Cl.
*B29C 41/22*    (2006.01)

(52) U.S. Cl.
USPC .............................. 264/259; 264/299; 264/308

(58) Field of Classification Search
CPC .......... B29C 41/02; B29C 41/22; B32B 38/14
USPC .............................. 264/78, 132, 259, 299, 308
See application file for complete search history.

(56) References Cited

U.S. PATENT DOCUMENTS

| | | | |
|---|---|---|---|
| 3,330,712 A | 7/1967 | Rowe | |
| 3,331,175 A | 7/1967 | Terrio | |
| 3,504,063 A | 3/1970 | Lemelson | |
| 3,520,509 A | 7/1970 | Carey | |
| 4,478,963 A | 10/1984 | McGarry | |
| 5,223,598 A | 6/1993 | Yamada et al. | |
| 5,547,737 A | 8/1996 | Evans et al. | |
| 5,766,500 A | 6/1998 | Bordener | |
| 6,578,476 B2 | 6/2003 | Liguori et al. | |
| 6,686,315 B1 | 2/2004 | Creed | |
| 6,699,419 B1 | 3/2004 | Kia et al. | |
| 6,964,722 B2 | 11/2005 | Taylor et al. | |
| 7,001,660 B2 | 2/2006 | Garitano | |
| 7,108,890 B2 | 9/2006 | Horne et al. | |
| 7,520,217 B2 | 4/2009 | Roberts et al. | |
| 2003/0008112 A1 | 1/2003 | Cole et al. | |
| 2004/0089407 A1 | 5/2004 | Halewood | |
| 2005/0227006 A1 | 10/2005 | Segall | |
| 2006/0126141 A1 | 6/2006 | Hirao et al. | |
| 2006/0203058 A1 | 9/2006 | Nerad et al. | |
| 2007/0020459 A1 | 1/2007 | Roberts et al. | |

FOREIGN PATENT DOCUMENTS

EP    0 600 187    6/1994

OTHER PUBLICATIONS

International Searching Authority; United States Patent and Trademark Office, "International Search Report," in related PCT application No. PCT/US2008/003769, mailed Jul. 25, 2008.

*Primary Examiner* — James Sanders
(74) *Attorney, Agent, or Firm* — Durham Jones & Pinegar Intellectual Property Law Group

(57) ABSTRACT

A process for printing an image on a surface of a resin member includes providing a transfer medium with an image on one side of the transfer medium, providing a liquid resin, placing the one side of the transfer medium with the image and the liquid resin in contact with each other, and partially curing the liquid resin to form the resin member while maintaining the image of the transfer medium in contact with an image side of the resin member. The process may include placing the liquid resin and/or the transfer medium in a mold for shaping the resin member during curing.

22 Claims, 6 Drawing Sheets

PROCESSES FOR PROVIDING IMAGES ON RESIN STRUCTURES

CROSS-REFERENCE TO RELATED APPLICATIONS

This application is a continuation of U.S. patent application Ser. No. 11/726,727, filed on Mar. 21, 2007 and titled "METHODS FOR APPLYING IMAGES TO RESIN MATERIALS," now U.S. Pat. No. 8,480,939, issued on Jul. 9, 2013, the entire disclosure of which is, by this reference, incorporated herein.

TECHNICAL FIELD

The present invention relates to methods and systems for applying images to materials. More particularly, the present invention provides methods and systems for applying images to polymeric substrates and other resin materials during their curing processes.

BACKGROUND

Numerous processes are currently utilized to apply images to substrates, such as by using masks, etching, photocopying, dye sublimation, dye diffusion thermal transfer, and ink jet, laser, and other printing techniques. The processes are less varied, however, when attempting to apply images to particle-filled resin materials, such as cultured marble. Such composite substrates have become very popular for a variety of home uses, in particular for kitchen and bathroom surfaces, because of their strength, durability, resistance to staining, and ease of cleaning.

It has been difficult to apply images deeply and permanently in resin materials. Consequently, image fading from wear or exposure to sunlight has been a major problem. Masking and etching have sometimes been used, but the processes have been expensive and time consuming.

For the most part, the industry has focused on applying images to substrates from a transfer medium, with the images formed from dyes capable of sublimation. In some cases, a substrate of resin material is formed and cured before applying the transfer medium. A gel coating may first be applied to a substrate, and the gel coat may also be allowed to cure. Then the transfer medium having an image formed by sublimable ink is brought into contact with the substrate or coating, and heat and/or pressure are applied to cause the image to sublimate into the substrate or the gel coat. Commonly, a heat press is used to apply substantial heat and pressure to facilitate the image transfer.

U.S. Pat. No. 7,001,660 (Garitano) discloses an image transfer method using a cured polymeric composite substrate. The substrate is brought into contact with an image transfer medium that carries an image formed by sublimable ink, while applying heat and/or pressure. U.S. Pat. No. 7,108,890 (Home) discloses applying a polymeric coating to a porous natural or synthetic surface. After the coating has cured, an image of sublimation inks is transferred to the coating from a transfer medium, by sublimation facilitated by heat and pressure. U.S. Patent Application Publication No. 2005/0227006 (Segall) discloses applying a gel coat to a substrate of composite material and then transferring an image to the coated composite by sublimation using heat and pressure.

FIG. 1 shows an example of a prior art image transfer process 10 involving polymeric substrate and images transferred to substrates or coatings by sublimation through heat and pressure. An image 12 is acquired from various means, such as a photograph or painting, and may be scanned by a scanner 14 into a computer 15 for editing. The computer 15 then prints the image on a transfer sheet 20 with a printer 16 employing dye sublimation inks.

Substrate 23 may be a natural product like stone, masonry, a ceramic, marble, or concrete, or a synthetic product, such as cultured marble or another polymeric composite material. If substrate 23 is a polymeric composite material, it is produced in a separate molding process (not shown). A liquid resin 26, such as a polyol resin, may be applied to the substrate 23 by any conventional technique, such as by brush 28 or spray 30. The resulting coating, referred to as a "receptor coating 24," is allowed to cure by drying, hardening, absorbing, or reacting with a catalyst.

Next, transfer sheet 20 is applied to a surface of receptor coating 24, and is subjected to heat and pressure by a heat press 22. The heat and pressure cause the ink to sublime into receptor coating 24 over a sublimation period. The resulting coated substrate has an image 12 imprinted on receptor coating 24.

The entire image transfer process 10 may require several hours of time to cure substrate 23 and receptor coating 24. In addition, time is required to heat and press image 12 onto receptor coating 24 and then to cool substrate 23 and receptor coating 24. Furthermore, a large and expensive heat press 22 must be used to apply substantial heat and pressure, typically around 300-500° F. and 20-60 psi. The image transfer process 10 is also labor intensive, requiring a skilled craftsman to operate heat press 22 and another craftsman to mix and pour liquid resin 26 to form substrate 23 and receptor coating 24. Finally, unless receptor coating 24 has incorporated therein an ultraviolet (UV) radiation-resistant material, the resultant image 12 will exhibit poor light-fastness.

FIG. 2 shows a cross-section of a product 29 resulting from image transfer process 10 of FIG. 1. Substrate 23 has a receptor coating 24 with an image 12. Product 29 may be a polymeric product, such as a cultured marble surface in a kitchen or bathroom, a decorative stone, a cement or brick surface or wall, a pot or a ceramic container, or tiles in the entryway of a home.

This type of image transfer process 10 tends to be expensive and time consuming. Substantial cure time is required to cure liquid resin 26 of substrate 23 and of receptor coating 24 before applying image 12. Typically, a large and expensive heat press 22 is used to apply heat and pressure for the image transfer. Even then, the manufactured article exhibits poor light-fastness, particularly under prolonged exposure to the ultraviolet rays of sunlight, unless a separate UV-protective coating is applied.

This light-fastness weakness is tied directly to the use of dye sublimation inks. As is well known by those familiar with the art of inkjet printing, dyes inherently exhibit poor light-fastness due to the fact that each dye molecule functions to provide color and is therefore exposed to UV radiation. However, dyes must be used for sublimable inks since the particulate property of pigments cannot be maintained during sublimation. Accordingly, this weakness makes dye sublimation inks particularly unsuitable for applications involving cultured marble and some other resin composites, since the areas in which these materials are used are often exposed to direct sunlight. Therefore, the use of dye sublimation inks requires the application of an additional material to provide UV protection or resistance, which adds time and cost to the production process and reduces the flexibility of the application.

Moreover, the sublimation process is problematic due to the limitations of the dyes and dye colors and the necessity of special transfer materials having dye-acceptable coatings thereon, which add to the total cost of the process. In addition, since heat and pressure are required to drive the sublimation process, the necessity of using heat-resistant substrates has eliminated the use of some otherwise desirable materials. For example, the heat required for sublimation typically exceeds the heat distortion temperature limits of some composite materials, such as cultured marble.

In view of the foregoing, it will be appreciated that providing methods for transfer of an image to a resin material without the need for applying heat and/or pressure would be a significant advancement in the art.

SUMMARY

In the present invention, methods of transferring images to a wide range of substrates are provided. In one illustrative embodiment, a transfer medium having an image thereon is placed image-up in a mold for forming polymeric substrates. A polyester resin with filler is poured into the mold over the transfer medium. As the polyester resin is cured, the image is transferred to the adjacent face of the polymeric substrate by chemical absorption. The polymeric substrate, which carries the image, is then removed from the mold and coated with a clear protective coating over the image.

In another illustrative embodiment, a thin layer of polyester resin is first poured into a mold for forming polymeric substrates to form a thin coating layer. A transfer medium having an image thereon is then placed image-down in the mold, over the thin coating layer. The image is transferred to the thin coating layer by chemical absorption as the polyester resin cures. The transfer medium is removed from the thin coating layer to which the ink is now absorbed. A polyester resin with filler, pigment, and initiator is then poured into the mold over the image and the thin coating layer. The image and the thin coating layer and, optionally, a polymeric substrate are then removed from the mold.

In another illustrative embodiment, a transfer medium having an image on one side is placed in contact with a thin layer of polymer resin. The one side of the transfer medium and the image are brought into direct contact with an adjacent surface of the thin layer of polymer resin while it is curing, allowing the image to transfer to the polymer resin during curing, as the polymer resin becomes a solid resin layer. The transfer sheet is then removed from the polymer resin, leaving the image on the adjacent surface of the solid resin layer.

DETAILED DESCRIPTION

Figure 1:
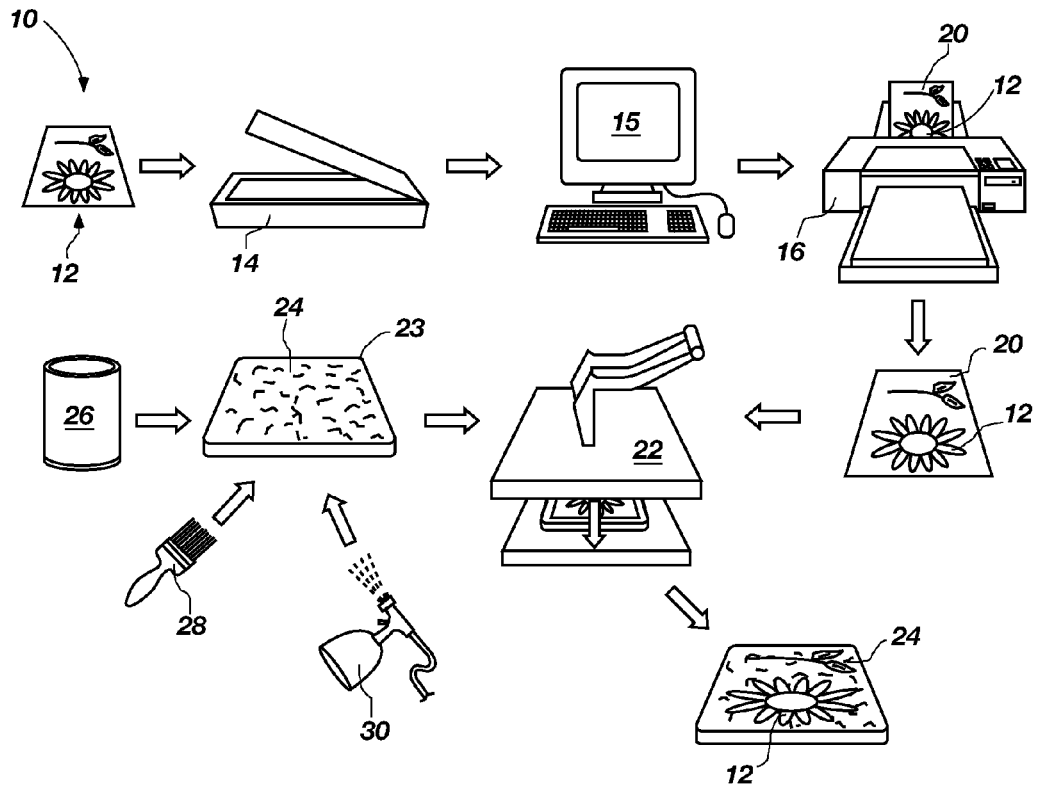
FIG. 1 is a flow diagram of a prior art process for forming an image on a substrate.
Figure 2:
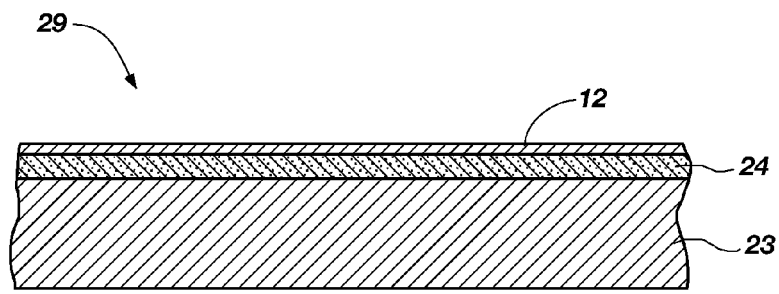
FIG. 2 is a cross-sectional view of a product formed according to the process shown in FIG. 1.

Before the present methods are disclosed and described, it is to be understood that this invention is not limited to the particular configurations, process steps, and materials disclosed herein, as such configurations, process steps, and materials may vary somewhat. It is also to be understood that the terminology employed herein is used for the purpose of describing particular embodiments only and is not intended to be limiting since the scope of the present invention will be limited only by the appended claims and equivalents thereof.

The publications and other reference materials referred to herein to describe the background of the invention and to provide additional detail regarding its practice are hereby incorporated by reference. The references discussed herein are provided solely for their disclosure prior to the filing date of the present application. Nothing herein is to be construed as an admission that the inventors are not entitled to antedate such disclosure by virtue of prior invention.

It must be noted that, as used in this specification and the appended claims, the singular forms "a," "an," and "the" include plural referents unless the context clearly dictates otherwise. Thus, for example, reference to "a liquid resin" includes a mixture of two or more resins, reference to "an image" includes reference to one or more of such images, and reference to "an ink" includes reference to a mixture of two or more inks.

Unless defined otherwise, all technical and scientific terms used herein have the same meanings as commonly understood by one of ordinary skill in the art to which this invention belongs.

In describing and claiming the present invention, the following terminology will be used in accordance with the definitions set out below.

As used herein, "comprising," "including," "containing," "characterized by," and grammatical equivalents thereof are inclusive or open-ended terms that do not exclude additional, unrecited elements or method steps. "Comprising" is to be interpreted as including the more restrictive terms "consisting of" and "consisting essentially of." As used herein, "consisting of" and grammatical equivalents thereof exclude any element, step, or ingredient not specified in the claim. As used herein, "consisting essentially of" and grammatical equivalents thereof limit the scope of a claim to the specified materials or steps and those that do not materially affect the basic and novel characteristic or characteristics of the claimed invention.

In contrast to the prior art process described in the Background, the embodiments of the present invention disclose a much faster, simpler, and less expensive process that is also capable of providing an image with much improved UV resistance. Images are transferred to substrates or coatings for substrates while the substrates or coatings are being formed and/or cured. The chemical absorption process that occurs while a substrate or coating that has not fully cured, or that is in a viscous or gel state, and is curing is sufficient to facilitate image transfer at room temperatures without the application of further heat or pressure.

The reasons that image transfer to resin in the viscous or gel state works well at room temperatures are not fully understood. However, it is thought that an image on a transfer sheet transfers readily to polymer molecules in a viscous or gel state because the smaller molecules, including polymer molecules, that are present in a material that has not fully cured are more mobile than the larger polymer molecules present in a fully cured, or solid state, material, and chemical bonding can be more readily effected. This mobility provides a high degree of bonding between ink and molecules that cannot be achieved with molecules in cured materials, unless sublimation ink designs are used, accompanied by substantial heat and pressure. This process is referred to herein as "chemical absorption." Other theories that could come into play in this invention are the likelihood of diffusion and/or solvation. There could be some diffusion of an image into the resin because of a relatively high solvent content of resin that has not fully cured. In addition, the solvent content of the resin gel may cause a dissolving or swelling of an ink-receptive coating on the transfer sheet, thus weakening the coating and facilitating image transfer to the resin. The foregoing theories are conjecture and have no effect on the scope of this patent application. As used herein, the term "liquid resin" refers to a resin in various stages of curing from a pure liquid to a viscous or gel form, and may include filler and/or reinforcement.

Image transfer is accomplished without sublimation, opening up the use of less expensive inks also providing improved light-fastness (such as solvent- or aqueous-based pigment inkjet inks) for the images. Thus, images are transferred quickly and inexpensively to substrates and coatings at room temperature using relatively inexpensive materials and yielding a higher quality product. Images are transferred to resin layers that can be easily applied to any structure or surface.

Figure 3:
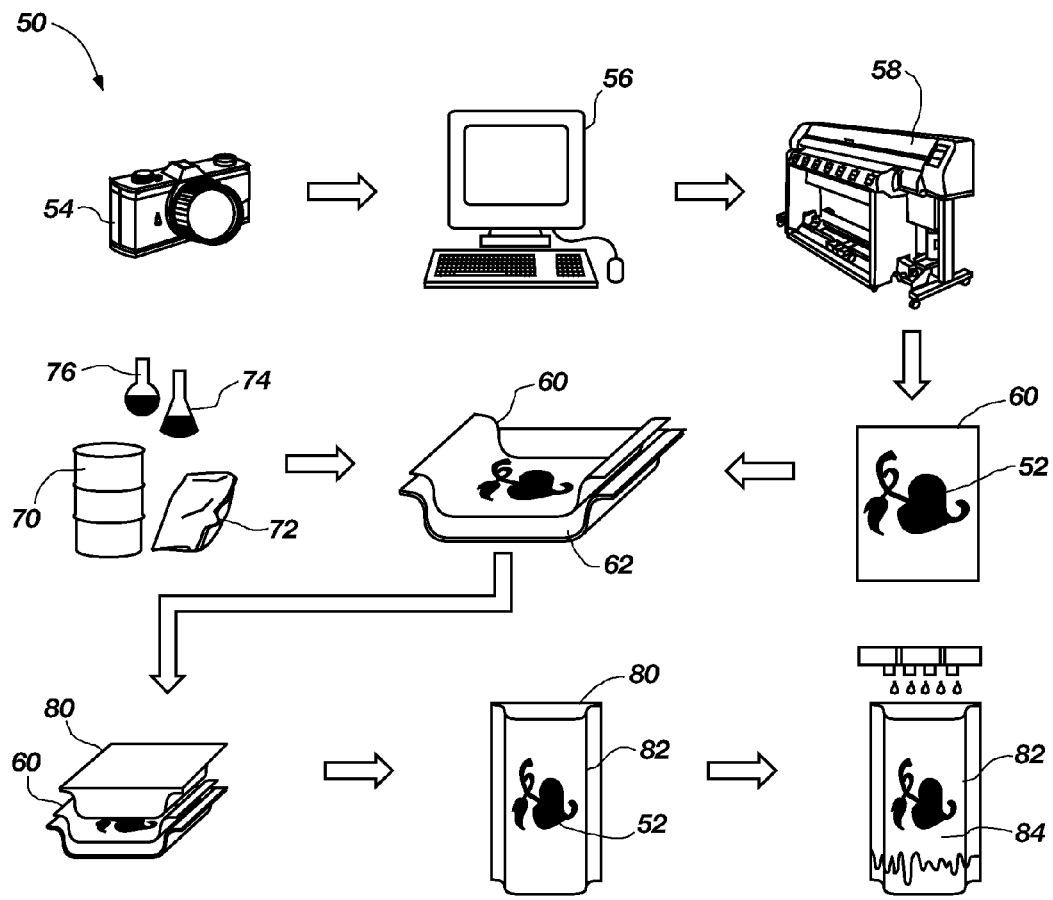
FIG. 3 is a flow diagram of a process for forming an image on a substrate according to one illustrative embodiment of the present invention.

Transferring Images to Substrate. Referring now to FIG. 3, one embodiment of the present invention is shown. An image transfer process 50 involves acquiring an image 52 from various means such as a camera 54, and inputting the image 52 into a computer 56 directly or through a scanner. Computer 56 may be used to process and edit image 52 before printing a reverse image (or mirror image) to a transfer sheet 60 using a wide-format inkjet type printer 58 employing any suitable type of ink, including pigmented inkjet inks.

Transfer sheet 60 is then laid face up in a mold 62. Various means, such as vacuum or taping, may be used to secure transfer sheet 60. A matrix 80 may be formed, for example, by combining a polyester resin 70 in liquid form, an inorganic filler 72, a pigment 74, and an initiator 76, which is then poured over transfer sheet 60 in mold 62. Matrix 80 cures through chemical cross-linking, and the pigmented ink of image 52 in transfer sheet 60 is absorbed during curing of polyester resin 70 of matrix 80 onto a surface 82 of matrix 80, apparently using a process of chemical absorption.

The cured or curing matrix 80 is removed from mold 62 at any selected time, and transfer sheet 60 is removed from surface 82. Further curing may be carried out, as needed. Image 52 and surface 82 are then covered with a top coat 84 to provide protection from scratching and wearing. Note that top coat 84 does not need to provide UV resistance for pigmented inks, as would be the case if dye-based inks were used to form image 52 on transfer sheet 60.

Figure 4:
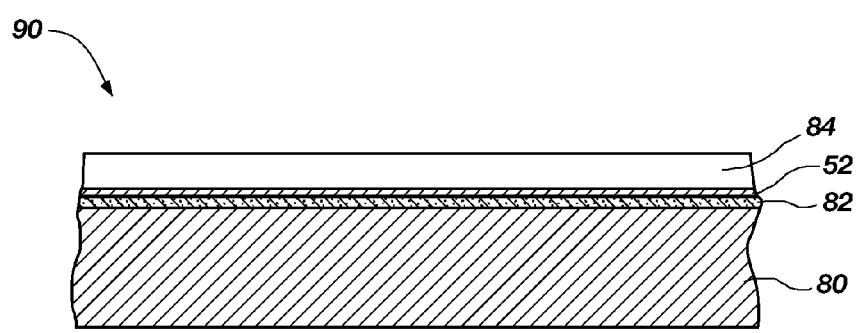
FIG. 4 is a cross-sectional view of a product formed according to the process shown in FIG. 3.

FIG. 4 shows a cross-section of a product 90 resulting from image transfer process 50 of FIG. 3. Matrix 80 has an image 52 on its surface 82, with a top coat 84 coating image 52 and surface 82 and protecting image 52. Product 90 may have a variety of uses and applications, including for trims, jambs, curbs, and sills.

Transferring Images to Substrate Coating. Looking next at FIG. 5, another embodiment of the present invention is shown. As in FIG. 3, an image transfer process 100 involves acquiring an image 102 from various means, such as a camera 104, and inputting image 102 into a computer 106 directly or through a scanner. Computer 106 may be used to process and edit image 102 before printing image 102 onto a transfer sheet 110 using a wide-format inkjet type printer 108 employing any suitable kind of ink, including pigmented inkjet inks.

Next, a mold 112 is covered with a thin, clear layer of resin 116 in liquid form, which thin, clear layer may be called a "coat 114," by spraying, pouring or brushing resin 116 therein. At any desired point, while coat 114 is still curing, transfer sheet 110 is laid face down in mold 112 so that image 102 is in contact with coat 114 as resin 116 cures. Again, image 102 is transferred to coat 114, apparently by a process of chemical absorption. Transfer sheet 110 is then removed from mold 112.

A matrix 130 is formed by combining, for example, a polyester resin 120 in liquid form, an inorganic filler 122, a pigment 124, and an initiator 126. Matrix 130 is then poured over coat 114 in mold 112. Matrix 130 solidifies through chemical cross-linking, and becomes integral with coat 114.

In contrast to the image transfer process 50 shown in FIG. 3, the current image transfer process 100 forms a coat 114, which may also be referred to as a "top coat," in mold 112 before matrix 130 is formed. Accordingly, matrix 130 is removed from mold 112 with coat 114 already covering matrix 130. Since image 102 is on a backside of coat 114, image 102 is also protected by coat 114 from scratching and wearing. Moreover, in the event that image 102 was formed from pigmented inks, coat 114 does not need to provide UV resistance.

Figure 5:
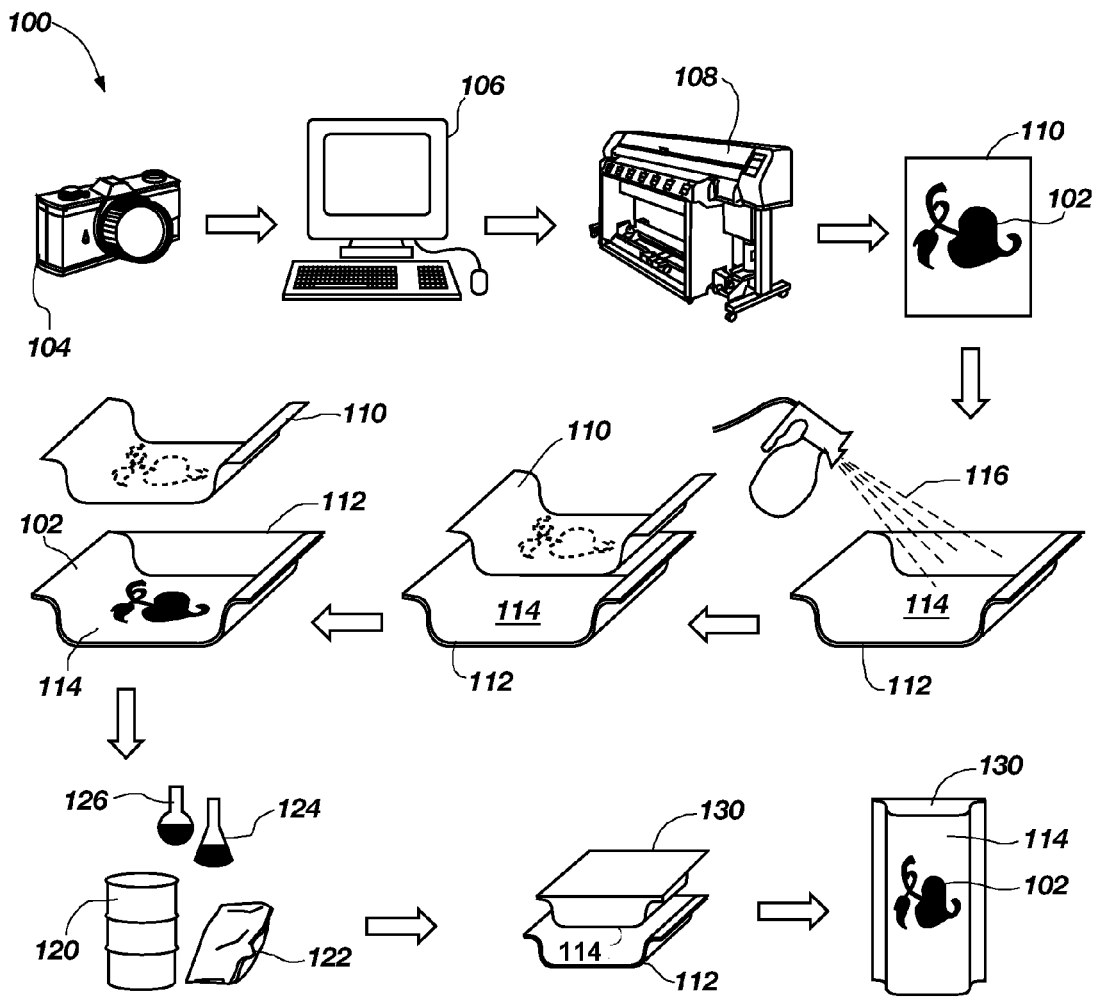
FIG. 5 is a flow diagram of another process for forming an image on a substrate according to another illustrative embodiment of the present invention.
Figure 6:
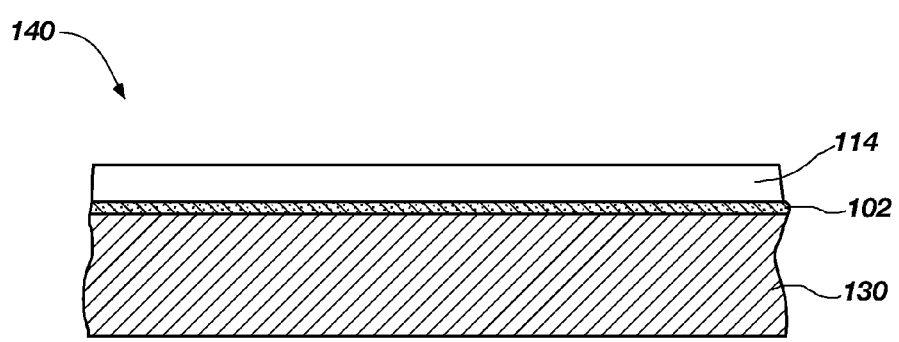
FIG. 6 is a cross-sectional view of a product formed according to the process shown in FIG. 5.

FIG. 6 shows a cross-section of a product 140 resulting from the image transfer process 100 of FIG. 5. Matrix 130 is integral with coat 114. Image 102 is on the backside of coat 114, which serves as a protective coating over image 102 and matrix 130, which may now be fully cured. As with the product 90 in FIG. 4, product 140 may be a polymeric product with a variety of uses and applications, including as panels for tub surrounds, shower enclosures, and wainscoting.

Transferring Images to Resin Layer. Looking now at FIG. 7, another embodiment of the present invention is shown, using a process 200 in which a design 208 or another image is applied to a layer of resin 204 in a liquid or other not fully cured state on a film 202, which serves as a mold. As in FIGS. 3 and 5, a design 208 or another image is obtained, edited, and printed on a transfer sheet 206. In this case, the mold is only a sheet of film 202, possibly having a thin framework (not shown) around film 202.

Film 202 is first partitioned in some manner, such as by using tape or strips of plastic. Film 202 is then covered with a thin layer of resin 204 in liquid form, such as by pouring from a container, or by spraying, brushing or other means. At some point in the curing process, when resin 204 reaches an appropriate viscosity, a transfer sheet 206 is applied to resin 204 with a design 208 being laid face down in contact with resin 204.

As resin 204 cures, design 208 is transferred to resin 204, apparently by a process of chemical absorption. Transfer sheet 206 is then carefully removed from resin 204, revealing design 208 on resin 204. Resin 204, which now carries design 208, will remain pliable for some period of time, making it easy to trim or cut with a simple knife 210 for various applications.

Figure 7:
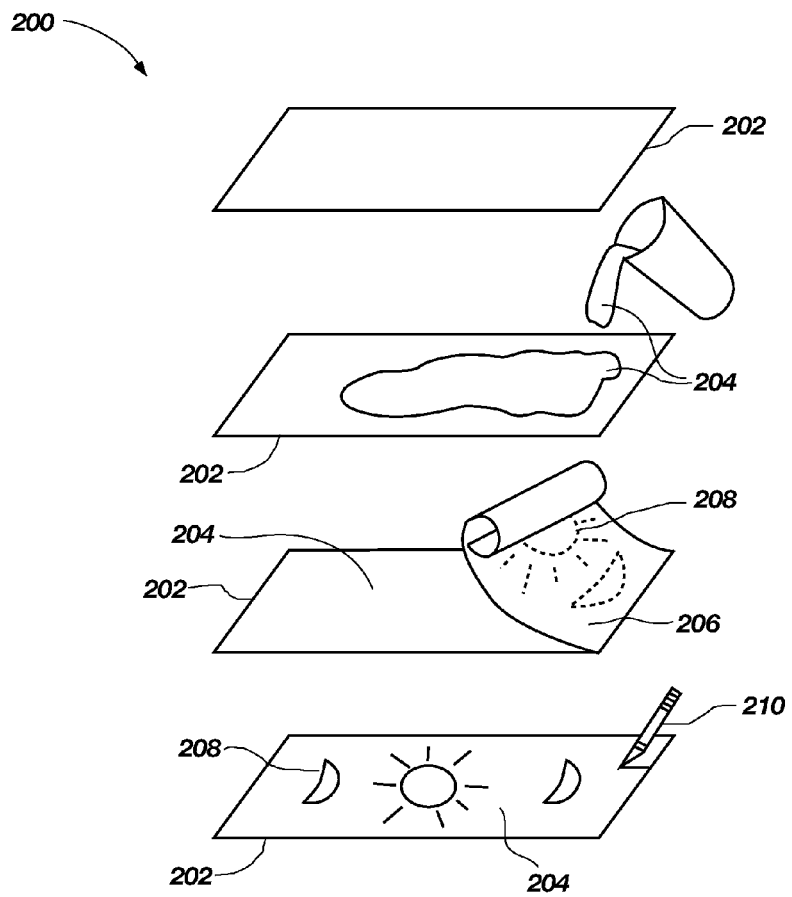
FIG. 7 is a flow diagram of another process for forming an image on a thin coating layer according to another illustrative embodiment of the present invention.
Figure 8:
FIG. 8 is a cross-sectional view of a product formed according to the process shown in FIG. 7.

FIG. 8 shows a cross-section of a cured resin product 220 resulting from the Process 200 of FIG. 7. Film 202 has a layer of resin 204 thereon with design 208 integral with the layer of resin 204. Resin 204 may be applied, while still in a viscous or gel state, directly to a substrate (not shown). Alternatively, resin 204 may be applied to a substrate later with various adhesives. Film 202 may then be stripped from the layer of resin 204. The result is a thin, durable, cured layer of resin 204 having a design 208 (FIG. 7) thereon and mounted on a substrate. The layer of resin 204 serves as a protective coating over design 208, protecting it from surface abrasion and, if necessary, UV damage.

Accordingly, product 220 has a wide variety of uses and applications and may be affixed to many different materials, including stone, wood, composites, metal, cement, brick, and glass, for many decorative purposes. Resin strips may also be used for covering exposed strip surfaces after cutouts are made in various substrates. The resin strips may be cured in a hardened form or may remain flexible until final application. Alternately, a sheet of resin 204 made according to this method may be used to overlay any type of surface.

Figure 9:
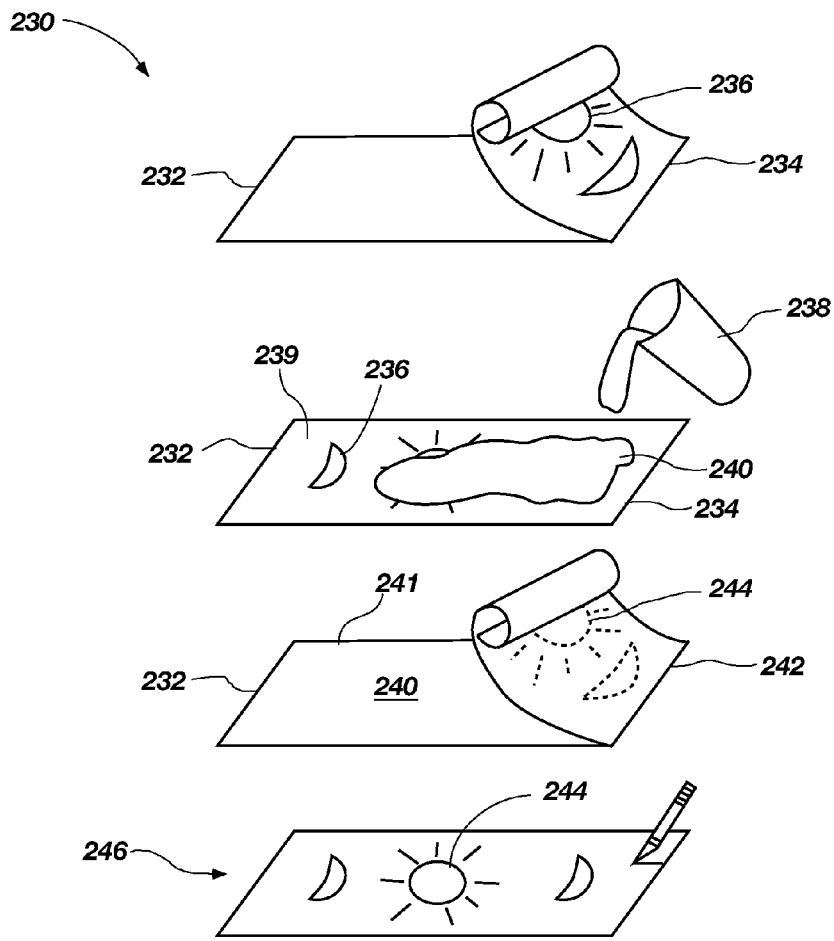
FIG. 9 is a flow diagram of another process for forming an image on a thin coating layer according to another illustrative embodiment of the present invention.
Figure 10:
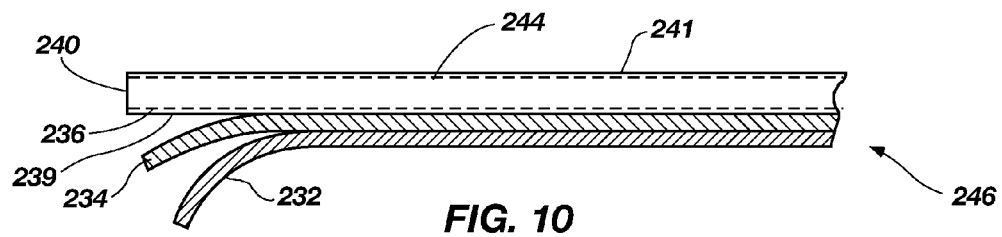
FIG. 10 is a cross-sectional view of a product formed according to the process shown in FIG. 9.

Looking now at FIGS. 9 and 10, a further alternative embodiment is shown. This process 230 is similar to process 200 described with respect to FIG. 7, except that the same or different designs 236, 244 or other images may be transferred to both sides of a layer of resin 240, so that a product 246 (FIG. 10) may be affixed to selected clear surfaces, such as glass or plastic, such as acrylic sheeting. As in FIGS. 3 and 5, a design 236, 244 is obtained, edited, and printed on a transfer sheet 234. In this case, a film 232 may serve as a mold, possibly with a thin framework (not shown) around film 232.

As shown in FIG. 9, transfer sheet 234 having design 236 thereon is placed on film 232 with design 236 facing up, away from film 232. Next, resin 240 in liquid form is poured from a container 238 onto transfer sheet 234, covering design 236. The resin 240 is allowed to partially cure while in contact with the design 236. Then, at a selected time, another transfer sheet 242 may be applied to a top side 241 of the layer of resin 240 with another design 244 face down and in contact with top side 241. Design 244 may be the same as design 236 on transfer sheet 234, or it may be a different design.

At a selected time, transfer sheet 242 is peeled off the layer of resin 240 leaving design 244 on top side 241 of the layer of resin 240. Likewise, as shown in FIG. 10, film 232 and transfer sheet 234 are peeled off an underside 239 of the layer of resin 240, exposing design 236 at underside 239 of the layer of resin 240.

A product 246 of process 230 is best seen in FIG. 10, as a layer of resin 240 having a design 244 embedded in the top side 241 of the layer of resin 240 and another design 236 embedded in underside 239 of the layer of resin 240. Product 246 may remain flexible in order to adhere to various surfaces, in numerous different applications, including as a two-sided design strip or layer to cover part or all of a glass or acrylic window or wall, so that designs 236 and 244 on underside 239 and top side 241, respectively, of the layer of resin 240 are displayed.

As used herein, a "mold" may take many shapes and forms. The term "mold" includes, without limitation, a table with sides, a deeper mold for various specialty items, and a flat surface or film that may or may not be framed in some manner to define a mold area.

Figure 11:
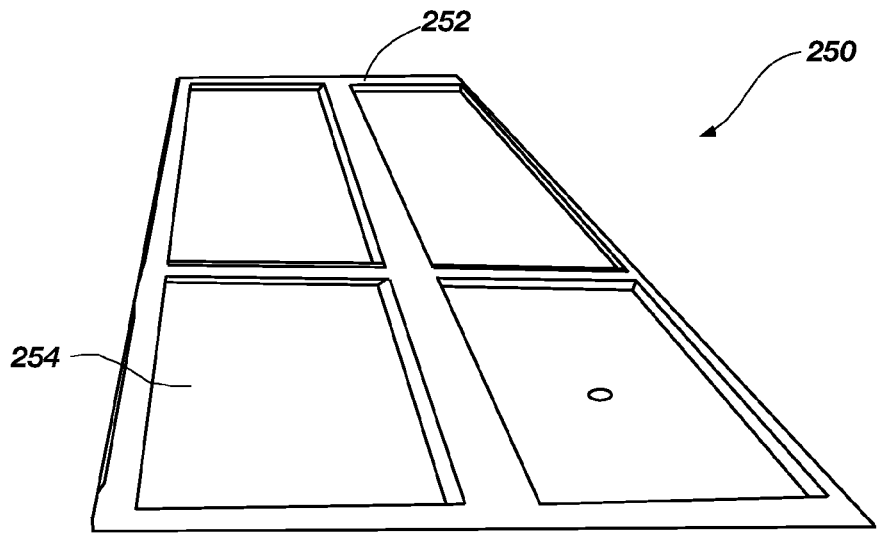
FIG. 11 is a perspective view of a mold used in connection with the above illustrative embodiments.
Figure 12:
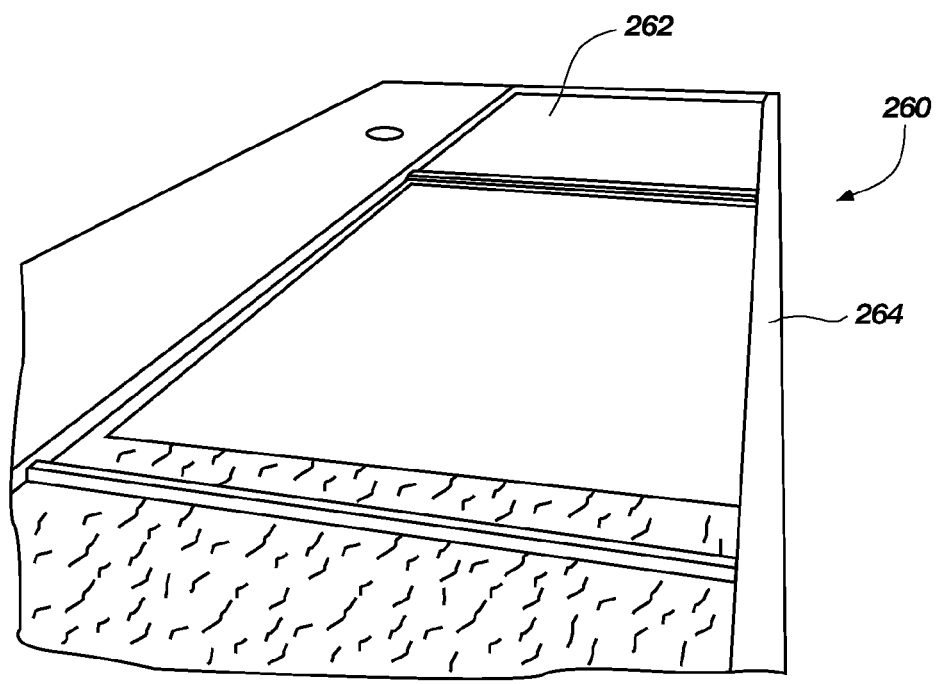
FIG. 12 is a perspective view of another mold used in connection with the above illustrative embodiments.

Referring now to FIGS. 11-12, examples are shown of various types of molds that can be used in the above processes according to the present invention. FIG. 11 shows a panel mold 250 having aluminum bars 252 and four glass tables 254. Panel mold 250 is relatively shallow since the thickness of each aluminum bar 252 is small compared to the other dimensions. Glass tables 254 provide a smooth, glossy, finished surface. Resin (not shown) in liquid form is poured on glass tables 254, before or after a transfer sheet (not shown) with a design or other image (not shown) thereon is positioned on glass tables 254, depending on the process being used. FIG. 12 shows a mold 260 for a shower floor. Textured black slate PIONITE® tables 262 are provided with aluminum bars 264 on the sides. Mold 260 provides shape and texture for the shower floors.

Materials

There are many materials that may be used as substrates in connection with the present invention. Natural materials, such as wood and stone, may be used only with the embodiments shown in FIGS. 7-8, which involve creating an imaged resin layer that may then be affixed to objects. In the embodiments shown and described in FIGS. 3-6, the processes involve preparing a substrate by pouring a liquid matrix into a mold.

For substrates, various types of polymeric materials are available—typically utilizing various types of resin matrices and fillers. The resin may be a polyester-type resin, and the filler may be of calcium carbonate, alumina tri-hydrate (ATH), similar inorganics, or fiberglass. In the construction industry, cultured marble is used in many applications, particularly in kitchens, baths, and entryways, to achieve a marbled look. Cultured marble is made by combining a matrix of specially formulated resin, ground calcium carbonate (limestone), powder pigments for color, and a hardening agent, such as methyl ethyl ketone peroxide (MEKP), acetyl acetone peroxide (AAP), or similar curing agent.

Other resins that may be used to form substrates and/or coatings include phenolic mixtures, melamine formaldehyde, unsaturated polyesters, vinyl esters, epoxies, cross-linkable acrylics, and polyurethanes. In addition, other thermo-set resins may be used, depending upon their properties, in addition to thermoplastic resins, which are applied as melts or solutions. These thermoplastic resins may include, but are not limited to, polyethylene, polyethylene terephthalate (PET), polypropylene, nylon, polystyrene, poly methyl methacrylate (PMMA or acrylics), and polycarbonates. Clear coat materials may be various types of resins having the capability to provide protection from sunlight fading, water resistance, color-fastness, stain resistance, wear and cleanability, and chemical resistance.

Transfer sheets or other transfer media for use in the present invention include paper, vinyl, fabric, and polymeric film. For forming an image on a transfer sheet, sublimation dyes of all types may be used, which vaporize when heated. However, in the present invention, image transfer is accomplished without elevated temperatures. Accordingly, any ordinary ink may also be used, such as solvent-based pigment inkjet inks, solvent-based dye inkjet inks, aqueous-based pigment inkjet inks, aqueous-based dye inkjet inks, dye diffusion thermal transfer inks, chemical toner, thermal wax transfer inks, and the like.

EXAMPLE 1

In this example, image transfer process 100 described above with respect to FIG. 5 was used. All activities were conducted at room temperature, between 65-75° F. Mold 112, which was a table surface, was cleaned and prepared. The table surface was framed off to the dimensions of the selected part, using layers of tape or adhesive strips to achieve a height of 35-40 mils. A resin 116 comprising a solid surface polyester resin in liquid form was mixed with MEKP initiator, 3% by weight. Resin 116 was poured into the framed area of the table surface and vibrated to release trapped air. Resin 116 was allowed to set for 11-15 minutes until it began to gel.

A transfer sheet 110 having an image 102 printed thereon in a pigment ink was laid face down on resin 116, and the air bubbles were pushed out with a smoothing bar as transfer sheet 110 and image 102 made contact with resin 116. Transfer sheet 110 was allowed to remain on resin 116 for 20-40 minutes. Separate test strips were used to determine when transfer of image 102 to resin 116 was complete. Transfer sheet 110 was carefully peeled off of resin 116.

Resin 116 was then ready to serve as a coat 114 for a matrix 130, or substrate. A matrix 130 of cultured marble was mixed, comprising resin, inert calcium carbonate filler, pigment, and initiator. Matrix 130 was allowed to gel for 20-28 minutes. The finished product 140 (FIG. 6) was removed from the table surface and post-cured for an hour at 180° F. to enhance hardness and stain resistance of coat 114.

EXAMPLE 2

In this example, process 200 described above with respect to FIG. 7 was used. All activities were conducted at room temperature, between 65-75° F. An uncoated gloss finish film 202 was placed on a flat surface. The selected size of the layer of resin 204 was framed up with tape or thin strips until it achieved a thickness of 35-40 mils. Resin 204 was mixed with an initiator and poured onto the framed area. The initiator was about 3% by weight, which caused resin 204 to begin to gel in about 11 to 15 minutes.

A transfer sheet 206 with a design 208 defined by pigment ink thereon was placed face down on resin 204. Transfer sheet 206 was left on resin 204 for about 20 to 40 minutes. Test strips were used on extra resin 204 to determine the optimal point of design 208 transfer. When transfer of design 208 was complete, film 202 was carefully pulled back from the surface of resin 204.

Resin 204 bearing design 208 on one side and film 202 as a backing on the opposite side was cut into strips of varying sizes (e.g., using knife 210, etc.). The pliable strips were applied to a substrate, and film 202 was released, leaving a glossy, finished surface with design 208 embedded about 35-49 mils beneath the surface of the layer of resin 204, protecting design 208 from abrasion.

Advantages and Applications

From the foregoing description, the advantages of the various embodiments of the present invention can be seen. By applying a transfer sheet carrying a design or another image to substrates or coatings formed from resin, one can cause the transfer of designs or other images directly to substrates and coatings using chemical absorption characteristics that are evident while curing the resin. Accordingly, expensive and cumbersome heat presses and other means of applying heat and pressure to the transfer sheets are not needed.

Moreover, expensive sublimation inks and their associated specialty coated ink-receptive materials are not needed. Instead, inexpensive solvent- or aqueous-based inks may be used to apply images to generic, inexpensive transfer sheets. If pigmented inks are chosen, the need for UV-resistant coatings is mitigated, thus reducing the number of requirements placed on the resin that will be used to form a protective overcoat, or top coat, for the design or other image. If dye-based inks are chosen, UV-resistant materials may be incorporated into the resin, as the application allows. In either case, the protective overcoat provides oxidation protection to the image, along with improved aesthetics.

The number of manufacturing steps and the time required for making prior art imaged structures are substantially reduced, since the image transfer and curing processes may be simultaneously carried out. In addition, the manufacture of thin imaged resin layers opens up many additional applications to many natural and man-made materials.

Because the transfer of the image is by chemical absorption, a larger variety of printing substrates is possible than in other methods for transferring printed images. Hence, printing need not be restricted to the often expensive, limited set of printing substrates that is required in other printing-transfer methods.

The ability to use chemical transfer broadens the variety of inks available for use. This reduces cost and allows for changes in ink and printing technology which are likely to give even further improvements in the print quality available.

Many applications are available for the present invention. In homes, the products may be used for kitchen and bathroom surfaces, such as countertops, vanity tops, sinks, bathtubs, showers, tub splashes, window sills, architectural surfaces, picture substrates and frames, bathroom implements, soap dishes, shower seats, shampoo shelves, and the like. In addition, the products of the present invention may be applied to entryway structures, walls and other surfaces, table and desk tops, and visual display surfaces such as signage, artwork, murals, and award and recognition items.

Furthermore, since a design or other image can be transferred with a variety of resins and is independent of the materials that might be used to back the resin, this technology can be used for fiber reinforced products, such as, to name only a few, wall panels, boats, tubs and showers, architectural forms (such as columns, facades, etc.), sporting goods to which a design or a logo might be attached, and even aerospace products wherein a design or other printed coating would be desirable.

This method of transferring designs or other images also provides a means of enhancing or replacing normal painting processes. Instead of painting a polymeric surface, the desired finish for that surface can be achieved by transferring a design or image of the color (which could include a pattern) onto the polymeric surface and therefore avoid the need for additional painting. This process has the advantage of protecting the colored/printed surface by a layer of resin. Thus, for example, with airplanes, the use of a polymeric surface prepared according to the present invention may eliminate the need for paint, resulting in a weight reduction and lower maintenance.

Although the above embodiments are representative of the present invention, other embodiments will be apparent to those skilled in the art from a consideration of this specification and the appended claims, or from a practice of the embodiments of the disclosed invention. It is intended that the specification and embodiments therein be considered as exemplary only, with the present invention being defined by the claims and their equivalents.

What is claimed:

1. A process for forming a resin member with an image, comprising:
    placing a topcoat resin in liquid form and a catalyst for the topcoat resin on a surface to define a topcoat of a resin member;

before the topcoat resin has fully cured, but the topcoat resin has cured enough to substantially retain its shape, placing an image into contact with the topcoat;

while a transfer medium bearing the image contacts the topcoat, continuing to cure the topcoat resin in an environment of substantially ambient temperature and substantially ambient pressure to substantially transfer the image to the topcoat; and after the image has been substantially transferred to the topcoat and before the topcoat resin cures completely, removing the transfer medium from the rear surface of the topcoat to expose the image.

2. The process of claim 1, comprising removing the transfer medium from the topcoat before the topcoat resin is fully cured.

3. The process of claim 1, wherein placing the topcoat resin on the surface comprises placing the topcoat resin on a surface configured to define a panel.

4. The process of claim 1, wherein placing the topcoat resin on the surface comprises placing the topcoat resin on a textured surface.

5. The process of claim 1, wherein placing the topcoat resin on the surface comprises placing the topcoat resin on a smooth surface.

6. The process of claim 1, wherein placing the topcoat resin on the surface comprises placing the topcoat resin on a surface bounded by a framework, the topcoat resin being placed within an area defined by the framework.

7. The process of claim 1, further comprising:
applying a substrate resin to the image to form a substrate, with the image positioned between the topcoat and the substrate resin.

8. The process of claim 1, further comprising:
printing the image onto the transfer medium.

9. The process of claim 8, wherein printing comprises defining the image from an organic solvent-based ink including a colored pigment.

10. The process of claim 8, wherein printing comprises defining the image from an organic solvent-based dye.

11. A process for applying an image to a resin member, comprising:
providing a partially cured topcoat for a panel, the topcoat including an outer surface and a rear surface opposite from the outer surface;
after providing the partially cured topcoat, placing an image disposed on one side of a first transfer medium into contact with the rear surface of the topcoat, with the topcoat being at least partially uncured, but cured enough to substantially retain its shape and to support the transfer medium as the transfer medium is applied to the rear surface of the topcoat and while transferring the image to the rear surface; and
with the image in place on the rear surface of the topcoat, further curing the material of the topcoat while simultaneously transferring the image to the rear surface of the topcoat, the further curing and the simultaneously transferring occurring in an environment of substantially ambient temperature and substantially ambient pressure.

12. The process of claim 11, wherein providing the partially cured topcoat comprises providing a partially cured topcoat with an outer surface that is smooth.

13. The process of claim 11, wherein providing the partially cured topcoat comprises providing a partially cured topcoat with an outer surface that is textured.

14. The process of claim 11, further comprising:
removing the transfer medium before fully curing the topcoat.

15. The process of claim 11, wherein providing the partially cured topcoat comprises the partially cured topcoat in a panel mold, with the outer surface disposed against a surface of the panel mold.

16. A process for applying an image to a resin member, comprising:
first, placing a liquid coating resin and a catalyst for the liquid coating resin on a table or mold surface for defining a topcoat of a resin member, the topcoat having a front surface with a configuration defined by the table or mold surface;
after the coating resin has at least partially polymerized, while the coating resin remains tacky, and before the topcoat has fully cured, placing a transfer medium bearing an image on a rear surface of the topcoat, opposite the front surface;
establishing contact between the image and the rear surface of the topcoat;
once contact between the image and the rear surface of the topcoat has been established, at least partially curing the topcoat at substantially ambient temperature and substantially ambient pressure with the image of the transfer medium in contact with the rear surface of the topcoat to bond the image to the rear surface of the topcoat;
after the image has bonded to the rear surface of the topcoat and before the liquid coating resin of the topcoat is fully cured, removing the transfer medium from the rear surface of the topcoat to expose the image;
with the image exposed, applying a liquid substrate resin onto the image to form a substrate of the resin member, with the image located between the topcoat and the substrate;
curing the liquid substrate resin to further define the resin member; and
after the liquid substrate resin has at least partially cured, removing the resin member from the table or mold.

17. A process for defining a topcoat for a resin member, comprising:
providing a partially cured topcoat disposed within a mold, the mold comprising a table or mold surface for shaping the topcoat, the topcoat including a rear surface and an outer surface opposite from the rear surface;
after providing the partially cured topcoat, placing an image disposed on one side of a first transfer medium into contact with the rear surface of the topcoat while material of the topcoat at the rear surface is cured enough to support the transfer medium while substantially retaining its shape and tacky enough to enable substantial transfer of the image to the rear surface;
with the image in place on the rear surface of the topcoat, further curing the topcoat while simultaneously transferring the image to the rear surface, the further curing and the simultaneously transferring occurring without applying above-ambient external heat or above-ambient external pressure to the topcoat, the image and the rear surface configured to be secured to a substrate;
after the image has been substantially transferred to the topcoat and before completely curing the topcoat, removing the transfer medium from the rear surface of the topcoat; and
applying the topcoat to the substrate, with the rear surface of the topcoat disposed against the substrate.

18. A process for applying an image to a resin member, comprising:

first, placing an image in contact with a tacky rear surface of a partially cured coating resin, the partially cured coating resin being rigid enough to retain its shape and supported by a table or mold surface;

after the image is in contact with the tacky rear surface of the partially cured coating resin, further curing the partially cured coating resin in an environment of substantially ambient temperature and substantially ambient pressure to further define the topcoat and to bond the image to a rear surface of the topcoat;

after the image has been substantially transferred to the partially cured coating resin and before fully curing the partially cured coating resin, removing the transfer medium from the rear surface of the topcoat;

with the image bonded to the rear surface of the topcoat, applying a substrate to the rear surface of the topcoat and to the image to further define a resin member; and removing the topcoat or the resin member from the table or mold surface.

19. A process for applying an image to a resin member, comprising:

first, placing a coating resin in a mold, the mold comprising a table or mold surface with a framework around the table or mold surface for defining a mold area, and for shaping a topcoat while curing the coating resin;

with the coating resin in the mold, partially curing the coating resin to form the topcoat;

before the coating resin of the resin member has fully cured, but while the coating resin is rigid enough to substantially retain its shape, placing an image carried by a transfer medium into contact with a tacky rear surface defining an image side of the topcoat;

while maintaining the image in contact with the image side of the topcoat, substantially transferring the image to the image side of the topcoat without applying above-ambient external heat or above-ambient external pressure; and after the image has been substantially transferred to the image side of the topcoat and before the coating resin is fully cured, removing the transfer medium from the image side of the topcoat, the image substantially remaining on the image side of the topcoat.

20. The process of claim 19, wherein further curing the coating resin includes substantially transferring the image to the image side of the topcoat at ambient temperature and ambient pressure.

21. The process of claim 19, wherein further curing the coating resin includes substantially transferring the image to the image side of the topcoat in an environment of substantially ambient temperature and substantially ambient pressure.

22. The process of claim 19, wherein further curing the coating resin includes substantially transferring the image to the image side of the topcoat, without applying substantial external heat or substantial external pressure.

* * * * *